United States Patent
Takahashi

(10) Patent No.: US 8,271,496 B2
(45) Date of Patent: Sep. 18, 2012

(54) COMPUTER-READABLE MEDIA, COMMUNICATION APPARATUS, AND COMMUNICATION SYSTEM

(75) Inventor: Yusaku Takahashi, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 384 days.

(21) Appl. No.: 12/571,243

(22) Filed: Sep. 30, 2009

(65) Prior Publication Data

US 2010/0088333 A1    Apr. 8, 2010

(30) Foreign Application Priority Data

Oct. 2, 2008    (JP) ................... 2008-257257

(51) Int. Cl.
  G06F 7/04      (2006.01)
  G06F 17/30    (2006.01)
(52) U.S. Cl. ......... 707/739; 707/754; 707/755; 707/765
(58) Field of Classification Search ............. 707/999.01, 707/739, 754, 755, 765, 999.006, 999.1, 707/999.107, 948, 949
See application file for complete search history.

(56) References Cited

U.S. PATENT DOCUMENTS

2005/0203916 A1    9/2005  Hirose
2009/0282052 A1*  11/2009  Evans et al. ................ 707/10

FOREIGN PATENT DOCUMENTS

| JP | 2003-006421 A | 1/2003 |
| JP | 2003-076502 A | 3/2003 |
| JP | 2004-192279 A | 7/2004 |
| JP | 2005-259015 A | 9/2005 |
| JP | 2007-072959 A | 3/2007 |
| JP | 2007-096970 A | 4/2007 |

OTHER PUBLICATIONS

Japan Patent Office, Notice of Reasons for Rejection for Japanese Patent Application No. 2008-257257, mailed Jul. 27, 2010.

* cited by examiner

*Primary Examiner* — Bruce Moser
(74) *Attorney, Agent, or Firm* — Baker Botts L.L.P.

(57) ABSTRACT

A computer-readable medium stores computer-readable instructions that control a communication on a communication apparatus that obtains a content summary information having at least content location information from a server. The instructions cause the communication apparatus to perform steps. The steps include receiving a delivery source information inputted through a user operation, determining whether the delivery source information includes a predetermined character string. Content summary information corresponding to the inputted delivery source information is obtained when the determining step determines that the predetermined character string is not included in the delivery source information. Content summary information corresponding to a predetermined alternative delivery source information is obtained when the determining step determines that the predetermined character string is included in the delivery source information.

10 Claims, 7 Drawing Sheets

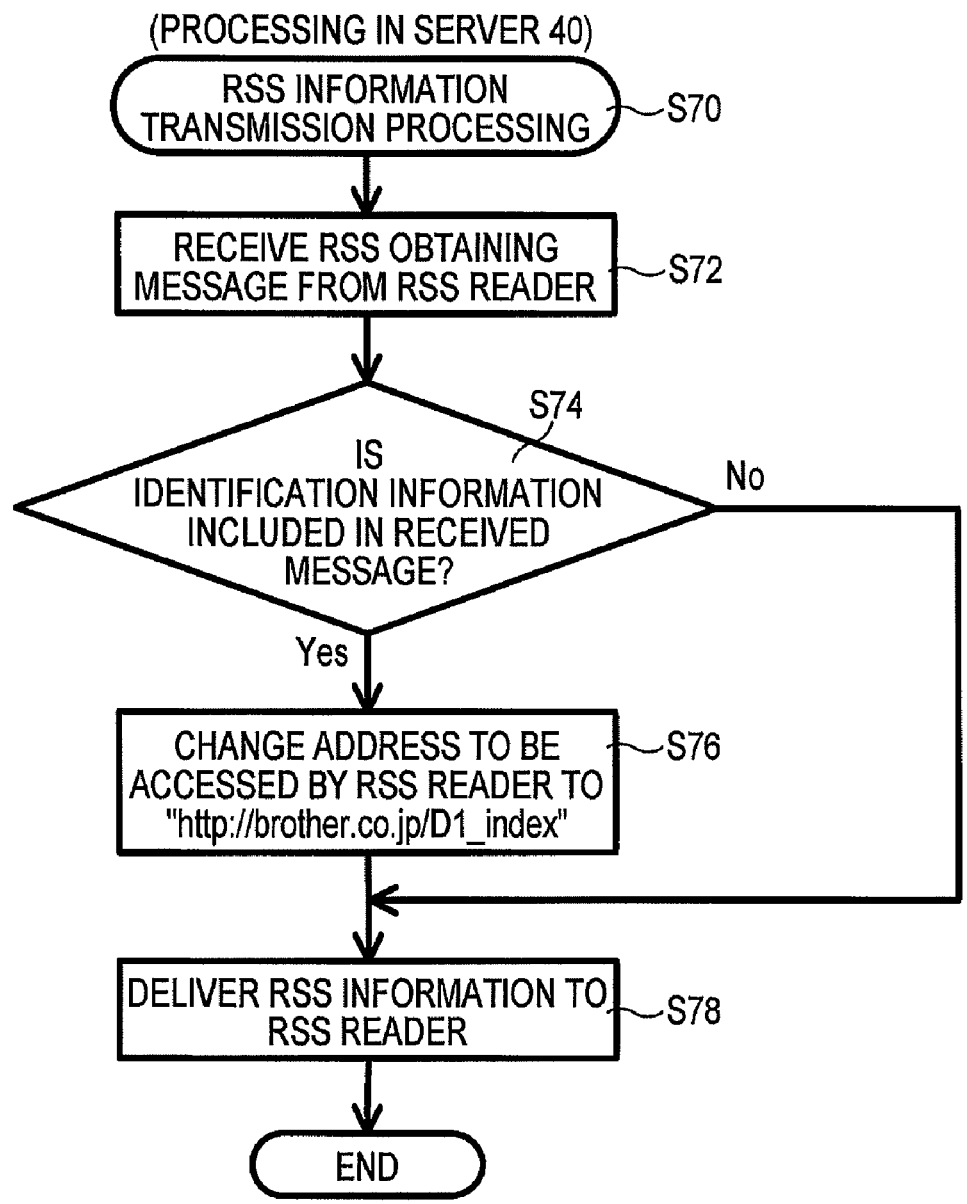

COMPUTER-READABLE MEDIA, COMMUNICATION APPARATUS, AND COMMUNICATION SYSTEM

CROSS REFERENCE TO RELATED APPLICATION

The present application claims priority from Japanese Patent Application No. 2008-257257, which was filed on Oct. 2, 2008, the disclosure of which is incorporated herein by reference in its entirety.

BACKGROUND OF THE INVENTION

1. Field of the Invention

The present invention relates to a computer-readable media, a communication apparatus, and a communication system.

2. Description of Related Art

In order to support users of a printer or a composite apparatus, a website may be used to provide information required by users who purchased the product, such as information about how to fix problems relating to the product or information about functional upgrading of the product, e.g., as shown in Japanese Unexamined Patent Application Publication No. 2003-006421.

A technique of delivering summary information in one of RSS-format and Atom-format content, to allow access to update information, e.g., on a website, has been widely used. The content summary information includes, for example, URLs as information about the locations of the summary and content provided on the web site. Hence, client terminals may obtain desired information using the location information.

A manufacturer may desire the delivery technique described above to be applied to content summary information on the support website, because this would allow customers access to content summary information. For instance, a customer, by viewing the content summary information, may view the content as necessary. In some cases, the manufacturer may want to provide a user of its product with value-added content summary information which is not available to other general customers.

However, when a manufacturer wants to provide a system that performs differentiation, e.g., accesses to specific content summary information are allowed only when the client terminal is a product manufactured by the manufacturer, or when a program of a product manufactured by the manufacturer is used, the operation burden on the client side becomes heavy, which may be problematic. A method for realizing this differentiation may be that the manufacturer first prepares content summary information for its users and content summary information for general customers, embeds the delivery source URLs corresponding to the respective content summary information in the website, and then asks a user to register the delivery source URL of the content summary information appropriate for the user. Nevertheless, performing such an operation without errors is difficult for many users and is a heavy operational burden which may prevent users from accessing the content summary information to which they should have access.

For example, a user who wants support information regarding a product may locate a website regarding the product by entering the product name in a search engine. Nevertheless, because the user may, on the website, wrongly register the delivery source URL of the content information for general customers, the delivery source URL corresponding to the content information for general customers may be registered even if the user is a user of the products of the manufacturer.

Alternatively, regarding the products manufactured by the manufacturer, the manufacturer may register the delivery source URL of the content summary information for users in advance at the time of shipping from the factory. Nevertheless, this method may create a problem because it prevents users from accessing the content summary information or registering the delivery source URL at the user's convenience, because there may be an upper limit on the number of registrations, or users may have their own preference.

SUMMARY OF THE INVENTION

To solve the problems described above, it is an object of the present invention to provide a computer-readable media, a communication apparatus, and a communication system which allow a user to obtain specific content summary information without a heavy operation burden and to obtain the content summary information when the user himself or herself wants to.

In an embodiment of the invention, a computer-readable medium is configured to store computer-readable instructions thereon for controlling a communication on a communication apparatus configured to obtain a content summary information comprising at least content location information from a server. The instructions, when executed, cause the communication apparatus to perform the steps of receiving a delivery source information inputted through a user operation, determining whether the delivery source information includes a predetermined character string, obtaining the content summary information corresponding to the inputted delivery source information when the determining step determines that the predetermined character string is not included in the delivery source information, and obtaining the content summary information corresponding to a predetermined alternative delivery source information when the determining step determines that the predetermined character string is included in the delivery source information.

In another embodiment of the invention, a communication apparatus comprises an obtaining section configured to obtain a content summary information comprising at least one content location information from a server, an information determining section configured to determine whether a delivery source information identifying the content summary information includes a predetermined character string, wherein the delivery source information is input through a user operation, a first information obtaining section configured to obtain the content summary information corresponding to the delivery source information when the information determining section determines that the predetermined character string is not included in the delivery source information, and a second information obtaining section configured to obtain the content summary information corresponding to a predetermined alternative delivery source information when the information determining section determines that the predetermined character string is included in the delivery source information.

In still another embodiment of the invention, a communication system, comprises a server configured to transmit content summary information including at least content location information, a registering section configured to register a delivery source information identifying the content summary information, and a communication apparatus. The communication apparatus comprises a registered information determining section configured to determine whether the delivery source information registered in the registering section includes a predetermined character string, and an identification information transmitting section configured to transmit an identification information to the server when the registered information determining section determines that the delivery source information includes the predetermined character string, wherein the server is configured to deliver the content summary information corresponding to the delivery source information. The communication system also comprises a content summary information obtaining section configured to obtain the content summary information transmitted from the server, wherein the server comprises a delivery information determining section configured to determine the content summary information to be transmitted, based on the identification information received from the communication apparatus.

Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 7 is a flowchart of RSS information obtaining processing executed by a server included in the communication system according to the still another embodiment.

DETAILED DESCRIPTION OF EMBODIMENTS OF THE INVENTION

Embodiments of the invention and their features and technical advantages may be understood by referring to FIGS. 1-7, like numerals being used for like corresponding portions in the various drawings.

Figure 1:
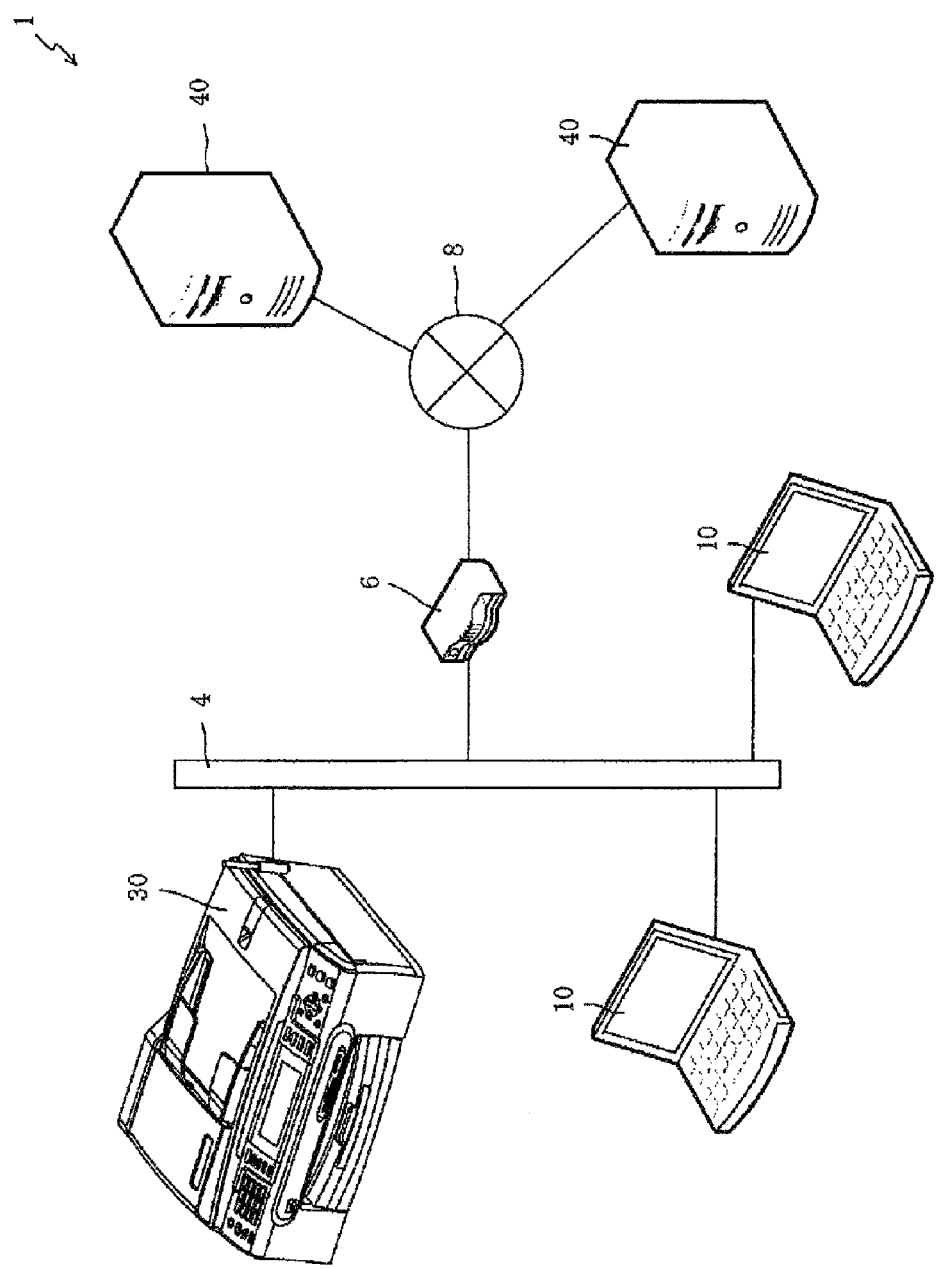
FIG. 1 is a schematic diagram of a communication system including a PC according to an embodiment of the invention.

FIG. 1 shows a schematic diagram of a communication system 1, which may comprise a personal computer 10, hereinafter interchangeably referred to as PC 10. PC 10 may function as a communication apparatus according to an embodiment of the invention. The communication system 1 also may comprise the PC 10 and another PC 10, a composite apparatus 30, <a server 40 and another server 40>. An RSS reader 141, e.g., as shown in FIG. 3, may be installed in the PC 10, and may correspond to an embodiment of a communication program according to the invention, as will be described in more detail herein, specifically with reference to FIGS. 2 and 3. FIG. 1 shows two PCs, two servers, and one composite apparatus. Nevertheless, this is meant to be merely exemplary and more or fewer of each component may be included in the communication system 1.

The PCs 10 and 10 and the composite apparatus 30 may be connected to a LAN 4. The LAN 4 may be connected through a router 6 to the Internet 8. The servers 40 and 40 also may be connected to the Internet 8. The servers 40 and 40 may be used to publish a website on the Internet 8 and may be configured to deliver the RSS information, e.g., "content summary information" corresponding to the website. In an embodiment of the invention as described herein, RSS information refers to data in the RSS format obtained by processing the update information of a website. This information may be alternatively and interchangeably called "feed information." The RSS information at least comprises a content URL, e.g., "content location information" which may be used for accessing the content on a website, and may also include a summary of text, content headlines, or the like. In an embodiment of the invention, "content" may correspond to information managed as a unit to which one URL is assigned for accessing the content. In other words, content may be the information corresponding to one URL on a website.

The PCs 10 and 10 each may have an RSS reader installed therein, in addition to a web browser for viewing websites. The RSS reader may be a program that causes the PCs 10 and 10 to execute a process of accessing a predetermined delivery source address, and to obtain RSS information corresponding to the delivery source address. The process to access and obtain RSS information may occur periodically or at a time specified by a user. The process of accessing RSS information executed by the PC 10 will be described in more detail herein with reference to FIG. 4.

The RSS reader may be configured to analyze the obtained RSS information and to cause displays connected to the PCs 10 and 10 to display the summary of text of the content, the content headlines, or the like, which may be included in the RSS information. Thus, a user may know the updated content on a website merely by viewing the URL, summary, or titles of the content obtained as RSS information, on the displays of the PCs 10 and 10.

Figure 2:
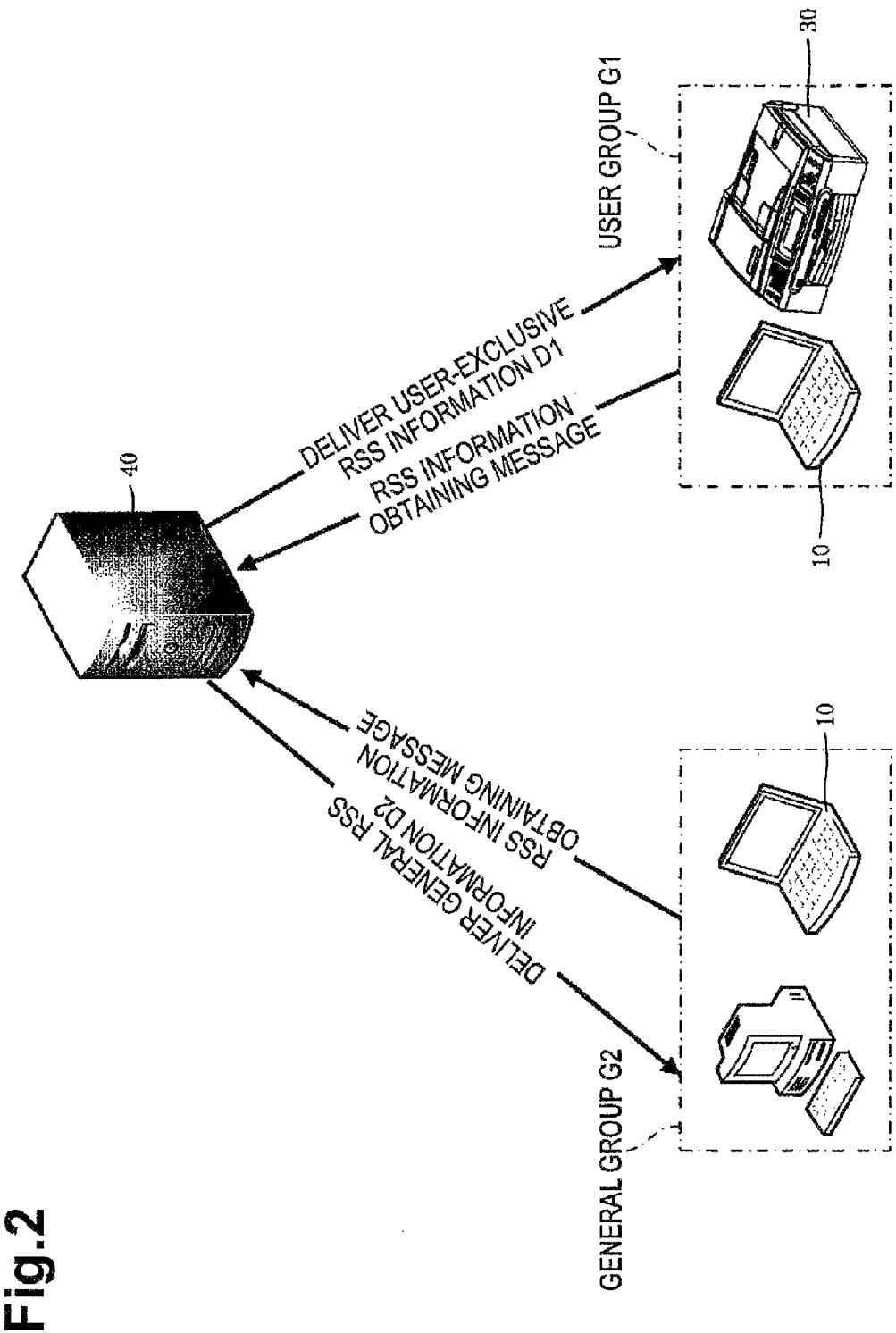
FIG. 2 is a schematic diagram illustrating the types of RSS information sent from a server to the PC.
Figure 3:
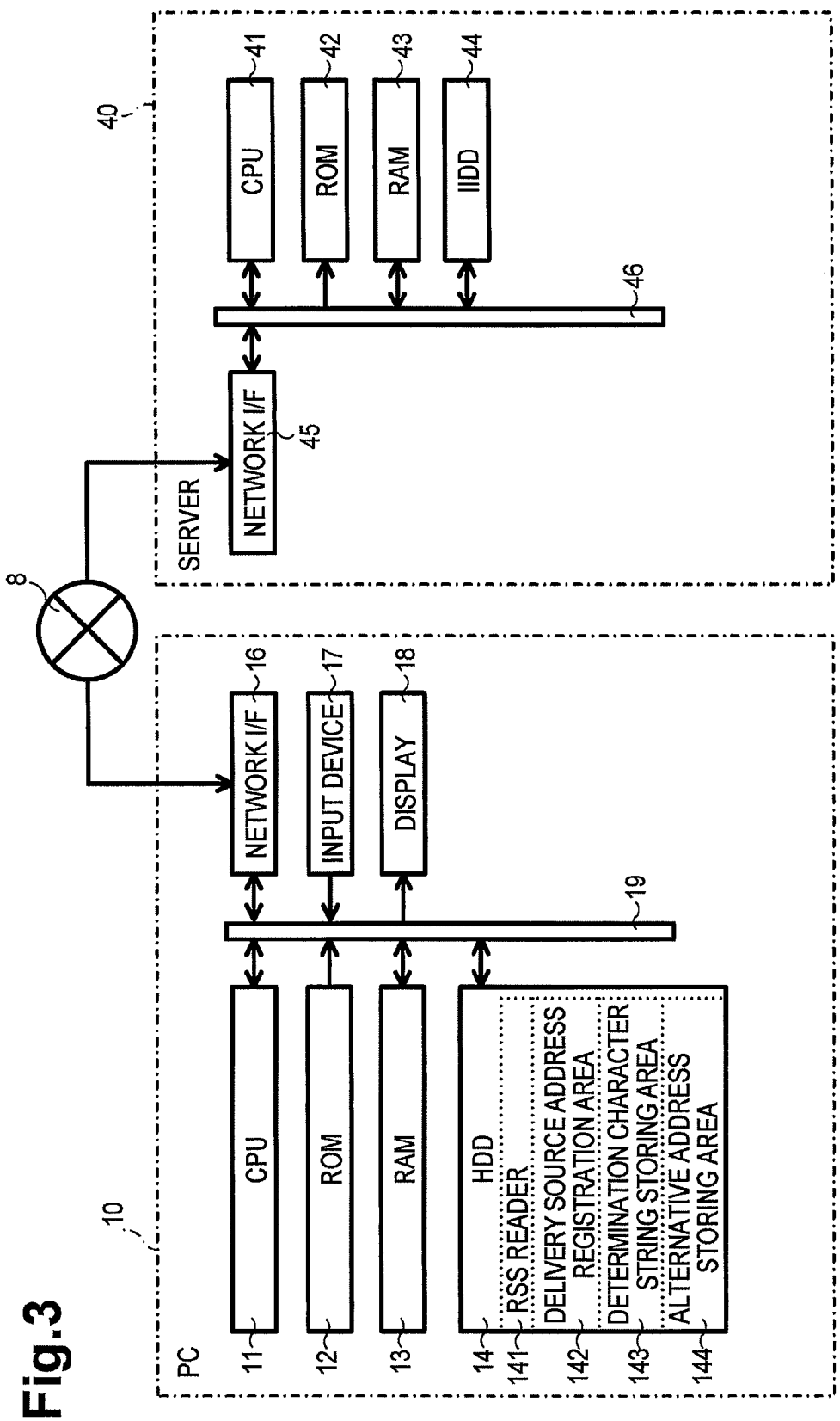
FIG. 3 is a schematic block diagram of the electrical configurations of the PC and server.

FIG. 2 schematically shows the types of RSS information that the server 40 respectively sends to the PCs 10 and 10, according to an embodiment of the invention. In the embodiment shown in FIG. 2, and described herein, the PCs 10 and 10 use RSS readers respectively provided by different manufacturers. The name of the manufacturer that provides an RSS reader used in the PC 10 is assumed to be company B. As shown in FIG. 2, a group of communication apparatuses that obtain RSS information using an RSS reader provided by company B may be represented by a user group G1, while a group of communication apparatuses that obtain RSS information using an RSS reader provided by companies other than company B may be represented by a general group G2.

Company B may provide at least two types of websites available for public viewing using the server 40. One type of website may be a website containing content for viewing by the users of products manufactured by company B, and the other type of website may be a general website containing content for viewing by general customers using RSS readers manufactured by companies other than company B. The server 40 may generate and deliver different types of RSS information corresponding to the respective websites. In the descriptions below, the RSS information delivered as update information of the website for users, e.g., user group G1, will be referred to as user-exclusive RSS information D1, and the RSS information delivered as update information of the general website, e.g., for user group G2, will be referred to as general RSS information D2, to distinguish among the types of RSS information delivered from the server 40.

Referring to FIG. 2, respective communication apparatuses that belong to the user group G1 and the general group G2 may obtain RSS information by sending a message for obtaining RSS information to the server 40. This information may be obtained as a reply from the server 40. Nevertheless, company B may want to ensure that the user group G1 receives the value added user-exclusive RSS information D1, which may be different from the general RSS information D2.

In an embodiment, the PC 10 and the communication apparatuses belonging to the user group G1 may be configured to be able to receive the user-exclusive RSS information D1 even if a user incorrectly registers the delivery source address of the general RSS information D2. In other words, even if a user registers a delivery source address incorrectly, e.g., without paying attention to whether the user is registering a general address or the address for users, the PC 10 and the communication apparatuses may be able to ensure that the user receives the user-exclusive RSS information D1. This process will be described in more detail herein reference to FIGS. 3 and 4.

In an embodiment of the invention, a device other than a PC, e.g., the composite apparatus 30, a printer, a copier, and a fax machine, may have an RSS reader installed therein, and may be configured to receive RSS information, as shown in FIG. 2. In this embodiment, when the device has been manufactured by company B, the device is grouped into the user group G1. Thus, similarly to the PC 10, the device may be configured to receive the user-exclusive RSS information D1 even if the registration by a user is wrong or incorrectly registered.

FIG. 3 shows a schematic block diagram of the electrical configuration of the PC 10 and the server 40, according to an embodiment of the invention. The PC 10 may comprise a CPU 11, a ROM 12, a RAM 13, a hard disk drive 14 ("HDD" 14), a network interface 16, hereinafter interchangeably referred to as network I/F 16, an input device 17, and a display 18, each of which may be connected to one another via a bus, e.g., bus line 19.

The CPU 11 may control respective components connected via the bus line 19 in accordance with constant values and programs stored in the ROM 12, the RAM 13 and the HDD 14. The ROM 12 may be a memory storing programs and the like for controlling the operation of the PC 10, and the RAM 13 may be a readable/writable memory for temporarily storing data necessary for the processing executed by the CPU 11.

The HDD 14 may be a hard disk drive, which may store the RSS reader 141. When the RSS reader 141 is installed in the PC 10, a delivery source address registration area 142, a determination character string storing area 143, and an alternative address storing area 144 may be created in the HDD 14. The RSS reader 141 may be a program that causes the CPU 11 to execute RSS information obtaining processing (S40) described later, and may cause the PC 10 to obtain RSS information. The RSS reader 141 may be a program provided by company B, as described above.

The delivery source address registration area 142 may be an area where a delivery source address input by a user operation may be registered. Here, the delivery source address may be any information which identifies the delivery source of RSS information and which may be expressed as a character string. Nevertheless, in the embodiment described herein, the delivery source address may be implemented specifically as a Uniform Resource Locator ("URL"). In the delivery source address registration area 142, the title of RSS information identified by a delivery source address also may be registered, in addition to the delivery source address.

The determination character string storing area 143 may be an area storing a determination character string, e.g., a "predetermined character string" used to determine whether or not the delivery source address registered in the delivery source address registration area 142 is a delivery source address corresponding to information delivered by company B. An example of the determination character string may be a character string that is included in the delivery source address of the general RSS information D2 delivered by the server 40. When more than one kind of general RSS information D2 is present, a character string commonly included in the respective delivery source addresses may be used.

The alternative address storing area 144 is an area storing an alternative address used to replace a delivery source address when the delivery source address has been determined to include the determination character string. This alternative address may be the delivery source address corresponding to the user-exclusive RSS information D1 delivered by the server 40. As described in more detail herein with reference to FIG. 4, when the delivery source address registered in the delivery source address registration area 142 includes the determination character string, the CPU 11 may obtain RSS information after replacing the delivery source address with this alternative address. Thus, even when the user of the PC 10 has incorrectly registered the delivery source address corresponding to the general RSS information D2 in the delivery source address registration area 142, the user may obtain the user-exclusive RSS information D1, as described previously with reference to FIG. 2.

The network I/F 16 may be an interface for connecting the PC 10 to the Internet 8. The input device 17, which may comprise, for example, a keyboard or a mouse, may be used to input a user operation. A user may input a desired delivery source address or an instruction to obtain RSS information through the input device 17. The display 18 may comprise, for example, a CRT display or liquid crystal display. The display 18 may display the delivery source address registered in the delivery source address registration area 142 and also may display the title of RSS information corresponding to the delivery source address.

The server 40 may comprise, for example, a CPU 41, a ROM 42 storing various control programs to be executed by the CPU 41 and data, a RAM 43 used as a storing area or work area for temporarily storing various data used by the CPU 41 during execution of the above programs, a hard disk drive 44 e.g., a HDD 44, and a network interface 45, hereinafter interchangeably referred to as a network I/F 45 for connecting the server 40 to the Internet 8. The CPU 41, the ROM 42, the RAM 43, the HDD 44, and the network I/F 45 may be connected to one another via a bus line 46. HDD 44 may store content published by the server 40, the user-exclusive RSS information D1, and the general RSS information D2.

The server 40 may deliver information requested by client terminals including the PC 10 in response to the information obtaining messages sent from the client terminals, by delivering content and RSS information to the clients that sent the messages.

Figure 4:
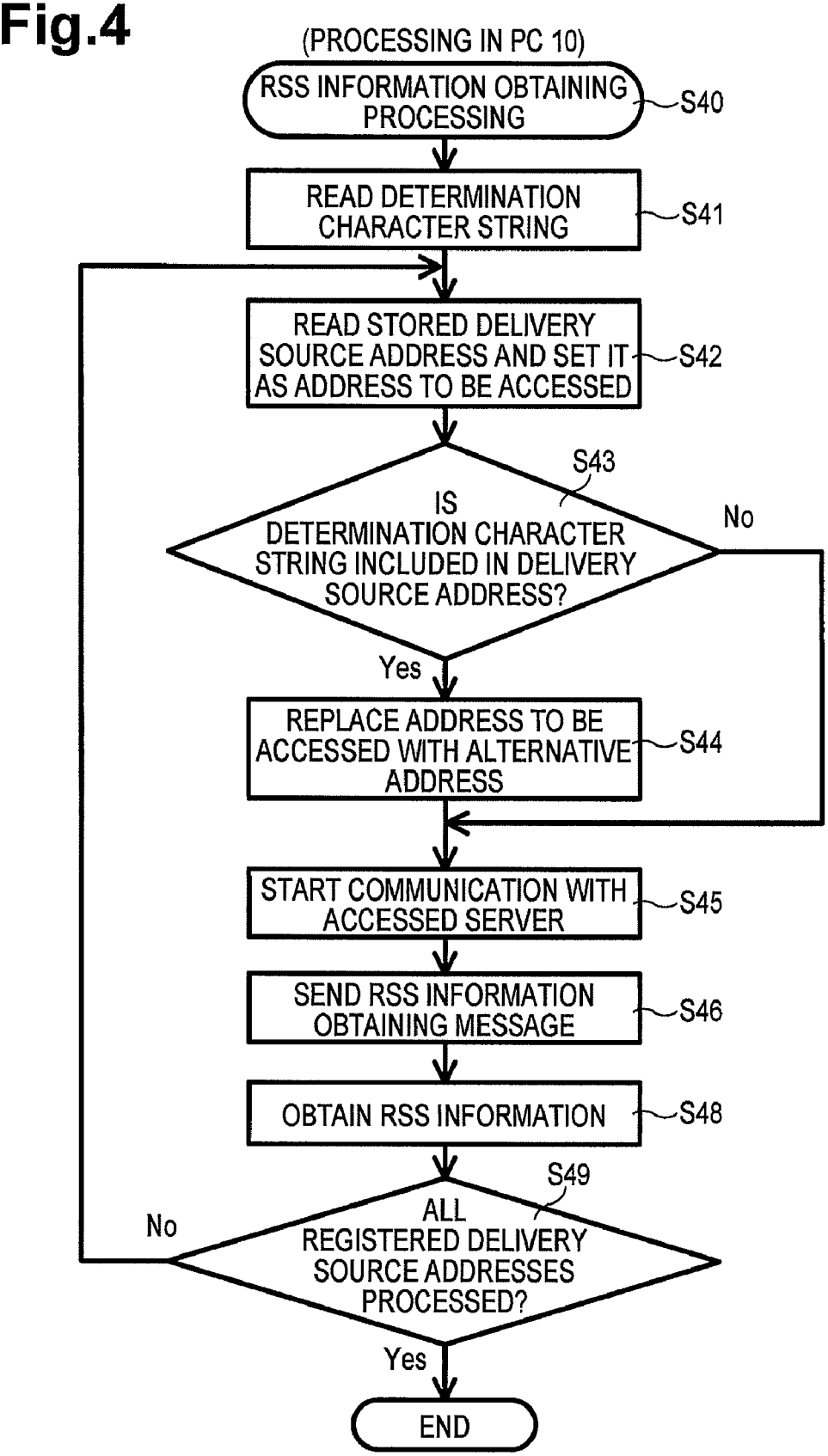
FIG. 4 is a flowchart of RSS information obtaining processing executed by the PC.

FIG. 4 shows a flowchart of RSS information obtaining processing, e.g., Step S40, executed by the PC 10. The RSS information obtaining processing may be executed by the CPU 11 in accordance with the RSS reader 141, as shown in FIG. 3. The RSS information obtaining processing may be executed periodically, or when an instruction to obtain RSS information is input by a user. The RSS information obtaining processing is processing for obtaining RSS information on the basis of the delivery source address registered in the delivery source address registration area 142, as shown in FIG. 3.

First, at Step S41, the determination character string stored in the determination character string storing area 143 may be read. Then, at Step S42, one of the delivery source addresses registered in the delivery source address registration area 142 (refer to FIG. 3) may be read and set as an address to be accessed. Next, at Step S43, it may be determined whether or not the delivery source address set as the address to be accessed includes the determination character string. Here, the case in which "the determination character string is included," e.g., "YES" at Step S43, may include not only the case in which the determination character string is included as part of the delivery source address, but also the case in which the delivery source address is exactly the same as the determination character string. The determination performed in Step S43 may determine whether or not the read delivery source address corresponds to the information delivered by company B.

When the determination result of Step S43 is negative, e.g., "NO" at Step S43, processing may skip Step S44 and may proceed to Step S45. At Step S45, the address which has been set as an address to be accessed, e.g., the delivery source address read from the delivery source address registration area 142, may be transmitted via the Internet 8. Thus, communication with a server that delivers the RSS information corresponding to the delivery source address may be started. Then, at Step S46, an RSS information obtaining message, may be sent to the server, requesting the RSS information corresponding to the delivery source address. At Step S48, the requesting device then may obtain the RSS information as a reply sent from the server. Thus, the PC 10 may obtain the RSS information corresponding to the delivery source address registered in the delivery source address registration area 142.

When the determination result of Step S43 is affirmative, e.g., "YES" at Step S43, a predetermined alternative address may be read from the alternative address storing area 144 (refer to FIG. 3). Then, at Step S44, the address to be accessed may be changed from the delivery source address read from the delivery source address registration area 142 to the alternative address. Then, processing may continue to Steps S45 and S46. At Step S48, RSS information corresponding to the alternative address, which is the changed address, may be obtained. Thus, when the delivery source address input by a user includes the determination character string, the RSS information corresponding to the predetermined alternative address may be obtained. Hence, even when a user wrongly registers the delivery source address corresponding to the general RSS information D2 (refer to FIG. 2), the user may obtain the user-exclusive RSS information D1 (refer to FIG. 2) corresponding to the alternative delivery source address.

Then, at Step S49, it may be determined whether or not all the delivery source addresses stored in the delivery source address registration area 142 have been processed. When the determination result of Step S49 is negative, e.g., "NO" at Step S49, processing may return to Step S42, and the processing may be repeated by reading the next delivery source address. On the other hand, when the determination result of Step S49 is affirmative, e.g., "YES" at Step S49, the RSS information obtaining processing ends.

In an embodiment of the invention, with respect to PC 10, a user of the RSS reader 141 provided by company B may obtain the user-exclusive RSS information D1 appropriate for the user not only when the delivery source address corresponding to the user-exclusive RSS information D1 has been registered in the delivery source address registration area 142, but also when the delivery source address corresponding to the general RSS information D2 has been registered. In other words, because specific RSS information may be obtained even if a user inputs a wrong delivery source address, a heavy operation burden, e.g., being made to select the best delivery source address from more than one kind of delivery source address, or being made to manually change a wrongly input delivery source address at the time of registering a delivery source address, may not be placed on the user.

As described above, the display 18 may display the delivery source addresses registered in the delivery source address registration area 142, and the titles of the RSS information corresponding to the respective delivery source addresses. This may allow a user to view the content of the delivery source address registration area 142. In an embodiment of the invention, even when the delivery source address stored in the delivery source address registration area 142 is the address corresponding to the general RSS information D2, the registered delivery source address itself may not be updated. Thus, even when the registered delivery source addresses are displayed on the display 18, the delivery source address corresponding to the user-exclusive RSS information D1 may not be displayed, whereby the leakage of the delivery source address corresponding to the user-exclusive RSS information D1 may be suppressed.

The delivery source address corresponding to the general RSS information D2 may include the determination character string. Nevertheless, the delivery source address corresponding to the user-exclusive RSS information D1 may or may not include the determination character string. When the delivery source address corresponding to the user-exclusive RSS information D1, e.g., the alternative address, is registered in the delivery source address registration area 142, it is also determined whether this delivery source address includes the determination character string. Thus, regardless of whether this delivery source address is replaced with the delivery source address read from the alternative address storing area 144, the user-exclusive RSS information D1 is obtained.

Figure 5:
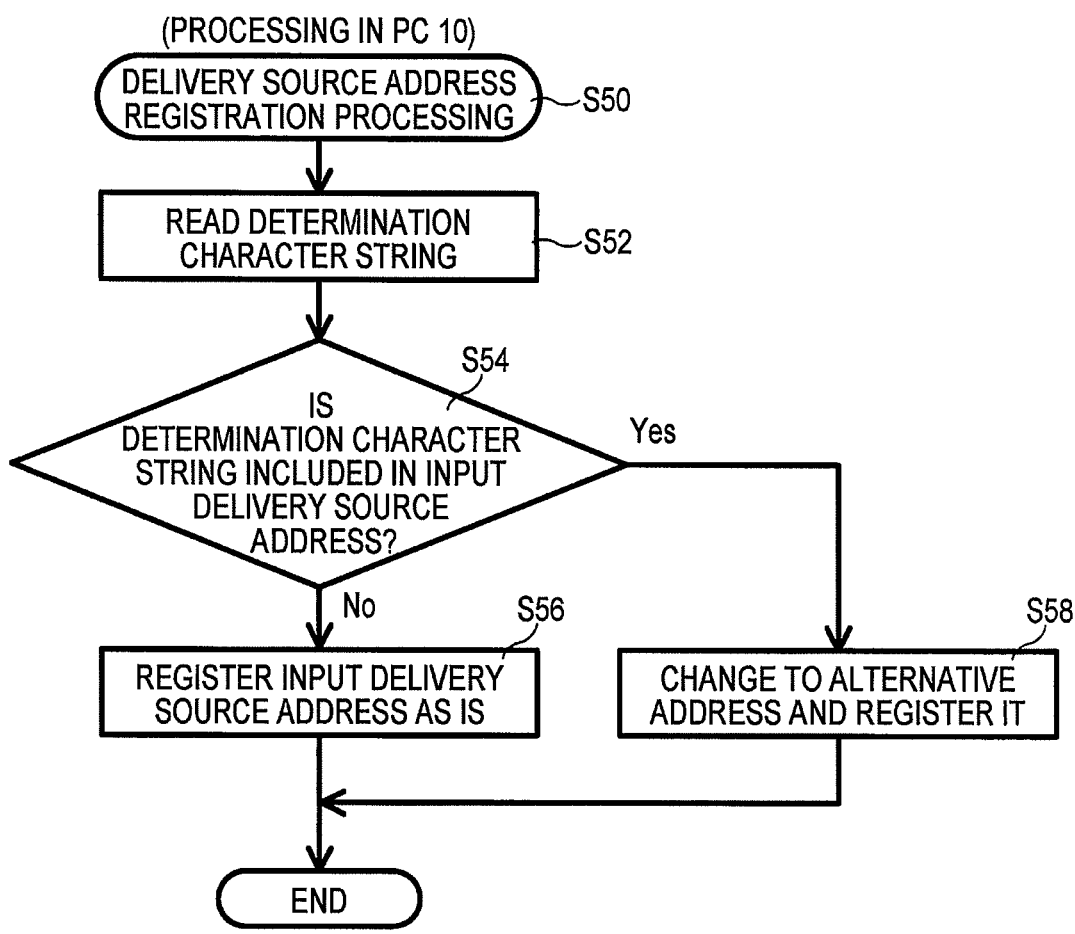
FIG. 5 is a flowchart of delivery source address registration processing executed by a PC according to another embodiment of the invention

FIG. 5 shows a PC 10 according to another embodiment of the invention. The physical configuration and electrical configuration of the PC 10 are assumed to be the same as those of the PC 10 according to the above embodiment. In the RSS reader 141 installed in the PC 10 according to the above embodiment, it is determined whether a delivery source address registered in the delivery source address registration area 142 includes the determination character string at the time of execution of the RSS information obtaining processing for obtaining the RSS information corresponding to the delivery source address.

However, in an RSS reader 141 installed in the PC 10 according to another embodiment, instead of determining whether a delivery source address includes the determination character string at the time when the RSS information obtaining processing is executed, it is determined whether a delivery source address includes the determination character string at the time when the delivery source address is registered in a delivery source address registration area 142, as shown in FIG. 3.

Specifically, the PC 10 according to this embodiment performs the determination regarding a delivery source address at the time when the delivery source address is registered, by performing registration processing (S50) described below with reference to FIG. 5. Hereinafter, components that are the same as those of the previous embodiment are denoted by the same reference numerals and the descriptions thereof are omitted, and only portions different from those of the above embodiment are described.

FIG. 5 shows a flowchart of delivery source address registering processing (S50) performed by the PC 10 according to another embodiment. This delivery source address registering processing (S50) may be executed when a user inputs, through a user operation, the delivery source address to be registered in the delivery source address registration area 142, and registers either the input delivery source address or a predetermined alternative delivery source address in the delivery source address registration area 142.

First, at Step S52, the determination character string may be read from a determination character string storing area 143 (refer to FIG. 3). Then, at Step S54, it is determined whether the read delivery source address includes the determination character string. As described in the previous embodiment, the case in which "the determination character string is included" includes both the case in which the determination character string is included as part of the delivery source address, and also the case in which the delivery source address is exactly the same as the determination character string.

When the determination result of Step S54 is negative, e.g., "NO" at Step S54, then at Step S56, delivery source address input through the user operation may be registered, as it was inputted, in the delivery source address registration area 142. Processing then may end On the other hand, when the determination result of Step S54 is affirmative, e.g., "YES" at Step S54, then at Step S58, the predetermined alternative address stored in the alternative address storing area 144 may be registered in the delivery source address registration area 142. Processing then may end.

After registration processing, the PC 10 of this embodiment may execute RSS information obtaining processing for obtaining the RSS information corresponding to the delivery source address registered in this manner, in accordance with the RSS reader 141. The RSS information processing executed by the PC 10 of this embodiment may be the same as the RSS information processing (S40) shown in FIG. 4, except that steps S43 and S44 of the RSS information obtaining processing are omitted. Thus, the illustration and detailed description of the RSS information obtaining processing also are omitted.

According to the PC 10 of this embodiment, similarly to the previously-described embodiment, because an alternative delivery source address may be registered in the delivery source address registration area 142 even when a user does not determine by himself or herself a delivery source address from more than one kind of delivery source address, the user may obtain the user-exclusive RSS information D1 without a heavy operation burden on the user.

Figure 6:
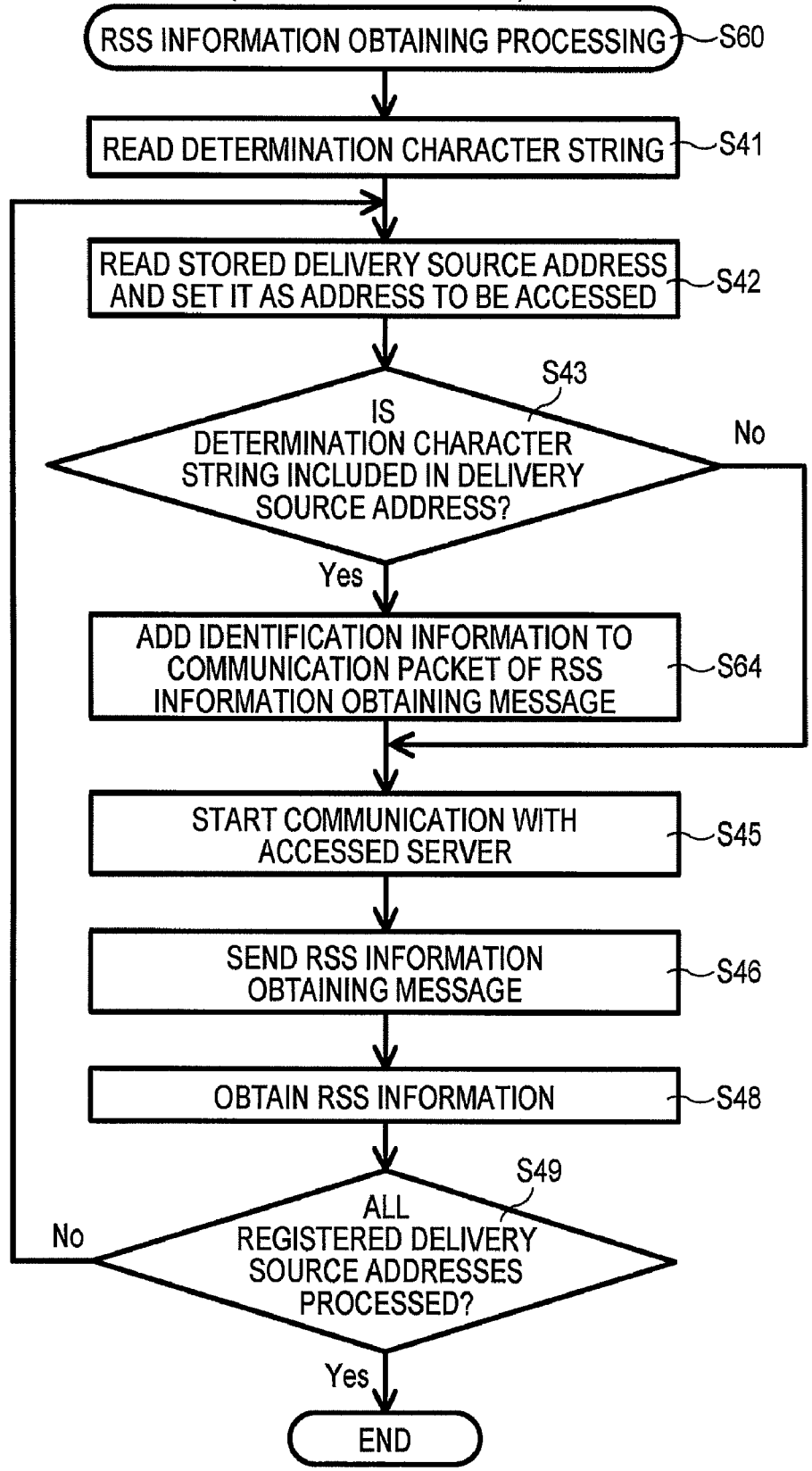
FIG. 6 is a flowchart of RSS information obtaining processing executed by a PC included in a communication system according to a still another embodiment.

FIGS. 6 and 7 describe a communication system 1 according to yet another embodiment, e.g., as an example communication system according to the invention. The previous embodiments are configured such that a user of the PC 10 may obtain the user-exclusive RSS information D1 under the control of the PC 10. Communication system 1 according to this embodiment is configured to allow a PC 10 to obtain the user-exclusive RSS information D1 by means of cooperation between the PC 10 and a server 40.

Because the schematic diagram of the communication system 1 according to this embodiment is similar to that of the communication system 1 described in the previous embodiments, the illustration and description thereof are omitted. Likewise, because the electrical configurations of the PC 10 and the server 40 included in the communication system 1 according to this embodiment are similar to those of the previously described embodiments, except that an alternative address storing area 144 is not provided in an HDD 14 (refer to FIG. 3) of the PC 10, the illustration and description thereof are omitted.

Similarly to the above embodiments, the user-exclusive RSS information D1 and the general RSS information D2 may be prepared in the server 40 in this embodiment. In the descriptions of this embodiment, an example of the delivery source address corresponding to the user-exclusive RSS information D1 may be "http://brother.co.jp/D1_index", and an example of the delivery source address corresponding to the general RSS information D2 may be "http://brother.co.jp/D2_index". The PC 10 of this embodiment also may perform determination regarding a delivery source address registered in a delivery source address registration area 142 using "brother.co.jp" as an exemplary determination character string.

FIG. 6 shows a flowchart of RSS information obtaining processing (S60) which may be executed by the PC 10. An RSS reader 141 installed in the PC 10 of this embodiment may cause the PC 10 to execute the RSS information obtaining processing (S60) shown in FIG. 6 instead of the RSS information obtaining processing (S40) shown in FIG. 4. The RSS information obtaining processing (S60) of this embodiment is different from the RSS information obtaining processing (S40) of the previous embodiment, in that Step S64 may be executed instead of Step S44.

Hereinafter, only those portions which differ from the previous embodiments are explained and portions which are the same as those of the previous embodiments are denoted by the same reference numerals, and the descriptions thereof are omitted.

Referring to FIG. 6, similarly to the above embodiments, at Step S43, it is determined in the RSS information obtaining processing (S60) of the embodiment whether the delivery source address set as the address to be accessed includes the determination character string. As described above, the exemplary determination character string in this embodiment is "brother.co.jp". When the determination result of Step S43 is affirmative, e.g., "YES" at Step S43, identification information may be added at Step S64 to the communication packet of an RSS information obtaining message, to be sent in a later processing step. In this embodiment, identification information stored in the HDD 14 at the time of installation of the RSS reader 141 may be used as the "identification information" added to the communication packet. When the determination result of Step S43 is negative, e.g., "NO" at Step S43, processing of Step S64 may be skipped.

Then, at Step S45, the delivery source address set as the address to be accessed in Step S42 may be sent over the Internet 8, and communication with a server that delivers the RSS information corresponding to the delivery source address may be started. Then, at Step S46, an RSS information obtaining message requesting RSS information corresponding to the delivery source address may be sent to the server.

In accordance with the RSS information obtaining processing (S60) described above, the PC 10 may send the identification information, which has been added to the RSS information obtaining message, to the server only when the delivery source address to be accessed includes the determination character string.

FIG. 7 shows a flowchart of RSS information transmission processing (S70) executed by the server 40 according to an embodiment of the invention. The RSS information transmission processing (S70) shown in FIG. 7 may be executed when communication with an RSS reader of a client terminal is established, and is processing for sending RSS information as a reply to the RSS reader of the client terminal.

First, at Step S72, the RSS information obtaining message sent from the RSS reader of a client terminal is received. Then it is determined whether or not the received RSS information obtaining message includes the identification information. When the determination result of Step S74 is affirmative, e.g., "YES" at Step S74, e.g., when it is determined that the RSS reader of the client terminal that is communicating is the RSS reader 141 manufactured by company B, then at Step S76, the address to be accessed by the RSS reader may be changed to the URL, e.g., an exemplary URL, such as "http://brother.co.jp/D1_index" of the user-exclusive RSS information D1. On the other hand, when the determination result of Step S74 is negative, e.g., "NO" at Step S74, the processing of Step S76 may be skipped. In other words, regardless of whether the address to be accessed by the RSS reader is the URL of the user-exclusive RSS information D1, e.g., "http://brother.co.jp/D1_index", or the URL, of the general RSS information D2, communication, e.g., "http://brother.co.jp/D2_index"), processing is continued with the accessed address. Then, at Step S78, the respective RSS information corresponding to the accessed addresses may be sent to the RSS reader, and processing may end.

In this manner, according to the communication system 1 of this embodiment, the server 40 may determine the RSS information to be obtained by the RSS reader, by performing different types of processing on the basis of whether the identification information has been received. Specifically, only when the other communication party is the RSS reader 141 which can add the above-described identification information to an RSS information obtaining message, may the address to be accessed by the RSS reader be changed such that the RSS reader may obtain the user-exclusive RSS information D1, regardless of the original address to be accessed. This is an advantage similar to the advantage provided by the PC 10 of the above embodiments.

In other embodiments of the invention, for instance, various devices other than PCs, such as the composite apparatus 30, a copier (not shown), and a fax machine (not shown) may have an RSS reader installed therein. This may allow a user to view the latest news headlines and the like without installing a browser, by causing an operation panel to display RSS information which can be obtained by the RSS reader. In the descriptions of the above first two embodiments, PC 10 may correspond to an example of the communication apparatus of an embodiment of the invention. Nevertheless, in another embodiment of the invention, devices such as the composite apparatus 30, if provided with an RSS reader, also may be considered to correspond to the communication apparatus according to an embodiment the invention. In this case, programs installed in the devices may be considered to correspond to the communication program according to embodiments of the invention.

In the descriptions of the above-described embodiments, server 40 may deliver RSS information in the RSS format, which may correspond to a summary of the updated information of a website, as the content summary information. Moreover, the program installed in the PC 10 may obtain RSS information. Nevertheless, in another embodiment of the invention, the format of the content summary information may not be not limited to RSS, and the invention is applicable to a communication apparatus, a communication program, and a communication system in which content information summarized in other formats, e.g., the "Atom" format, which may be sent or received.

Further, in the descriptions of the above embodiments, one type of determination character string may be stored in one PC 10. Nevertheless, in other embodiments of the invention, more than one type of determination character string may be stored in the PC 10. In such embodiments, all the possible delivery source addresses which may be wrongly input by a user may be included, such that specific RSS information may be reliably obtained by a user.

In the descriptions of the above embodiments, server 40 may deliver the user-exclusive RSS information D1 and the general RSS information D2. Nevertheless, in other embodiments of the invention, the types of information delivered by the server 40 are not limited to those described above. For example, the server 40 may be configured in such a manner as to deliver different RSS information for respective apparatuses provided by the manufacturer itself, in order to deliver support information corresponding to respective apparatuses separately for respective types of client terminals, e.g., PCs, copiers, printers, and composite apparatuses In these embodiments, respective terminals may access the server using alternative addresses corresponding to the respective types of terminals, or may send identification information corresponding to the respective types of terminals to the server in order to obtain RSS information corresponding to the respective types of terminals.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. A non-transitory computer-readable medium configured to store computer-readable instructions thereon for controlling a communication on a communication apparatus configured to obtain a content summary information comprising at least content location information from a server, wherein the instructions, when executed by a processor, cause the communication apparatus to perform the steps of:

receiving an inputted delivery source information;

determining whether the delivery source information includes a predetermined character string;

changing the inputted delivery source information into a predetermined alternative delivery source information different from the inputted delivery source information when it is determined, in the determining step, that the predetermined character string is included in the delivery source information and not changing the inputted delivery source information when it is determined, in the determining step, that the predetermined character string is not included in the delivery source information; and obtaining (a) the content summary information corresponding to the inputted delivery source information that is not changed in the changing step when it is determined, in the determining step, that the predetermined character string is not included in the delivery source information, and (b) the content summary information corresponding to the predetermined alternative delivery source information changed from the inputted delivery source information in the changing step when it is determined, in the determining step, that the predetermined character string is included in the delivery source information.

2. The non-transitory computer-readable medium according to claim 1, wherein when it is determined, in the determining step, that the predetermined character string is included in the delivery source information, the obtaining content summary information step comprises the steps of:

adding an identification information to a content summary information obtaining message; and transmitting the content summary information obtaining message to the server.

3. The non-transitory computer-readable medium according to claim 1, wherein the delivery source information is input on a basis of a user operation and registered in a registering section.

4. The non-transitory computer-readable medium according to claim 1, wherein the obtaining content summary information step comprises:

reading the predetermined alternative delivery source information from a storing section; and obtaining the content summary information corresponding to the read predetermined alternative delivery source information.

5. A communication apparatus comprising:

an obtaining section configured to obtain a content summary information comprising at least one content location information from a server;

an information determining section configured to determine whether an inputted delivery source information identifying the content summary information includes a predetermined character string;

an information changing section configured to change the inputted delivery source information into a predetermined alternative delivery source information different from the inputted delivery source information when the information determining section determines that the predetermined character string is included in the delivery source information and to not change the inputted delivery source information when the information determining section determines that the predetermined character string is not included in the delivery source information;

a first information obtaining section configured to obtain the content summary information corresponding to the delivery source information that is not changed by the information changing section when the information determining section determines that the predetermined character string is not included in the delivery source information; and a second information obtaining section configured to obtain the content summary information corresponding to the predetermined alternative delivery source information changed from the inputted delivery source information by the information changing section when the information determining section determines that the predetermined character string is included in the delivery source information.

6. The communication apparatus according to claim 5, wherein when the information determining section determines that the predetermined character string is included in the delivery source information, the second information obtaining section is configured to change the input delivery source information into the predetermined alternative delivery source information, and to obtain the content summary information as information corresponding to the changed delivery source information.

7. The communication apparatus according to claim 5, wherein the second information obtaining section is configured to add an identification information to a content summary information obtaining message to transmit to the server, when the information determining section determines that the predetermined character string is included in the delivery source information.

8. The communication apparatus according to claim 5, further comprising a registering section, wherein the information determining section is configured to determine whether the predetermined character string is included in the delivery source information, and the delivery source information is input on a basis of a user operation and registered in the registering section.

9. The communication apparatus according to claim 5, further comprising a storing section, wherein the second information obtaining section is configured to read the predetermined alternative delivery source information from the storing section and to obtain the content summary information corresponding to the read predetermined alternative delivery source information.

10. A communication system, comprising:

a server configured to transmit content summary information including at least content location information;

a registering section configured to register a delivery source information identifying the content summary information;

a communication apparatus comprising:

a registered information determining section configured to determine whether the delivery source information registered in the registering section includes a predetermined character string; and an identification information transmitting section configured to transmit an identification information to the server when the registered information determining section determines that the delivery source information includes the predetermined character string and to not transmit an identification information to the server when the registered information determining section determines that the delivery source information does not include the predetermined character string, wherein the server is configured to deliver the content summary information corresponding to the registered delivery source information when the identification information is not transmitted to the server, and to deliver the content summary information corresponding to a predetermined alternative delivery source information different from the registered delivery source information when the identification information is transmitted to the server; and a content summary information obtaining section configured to obtain the content summary information transmitted from the server; and wherein the server comprises a delivery information determining section configured to determine the content summary information to be transmitted, based on the identification information received from the communication apparatus.

* * * * *